Sept. 7, 1954 L. P. SHARPLES 2,688,405
CENTRIFUGE CONSTRUCTION FOR SEPARATING SOLIDS FROM LIQUIDS
Filed Aug. 9, 1948 7 Sheets-Sheet 2

INVENTOR.
LAURENCE P. SHARPLES
BY
Howson & Howson
ATTORNEYS

Sept. 7, 1954 L. P. SHARPLES 2,688,405
CENTRIFUGE CONSTRUCTION FOR SEPARATING SOLIDS FROM LIQUIDS
Filed Aug. 9, 1948 7 Sheets-Sheet 4
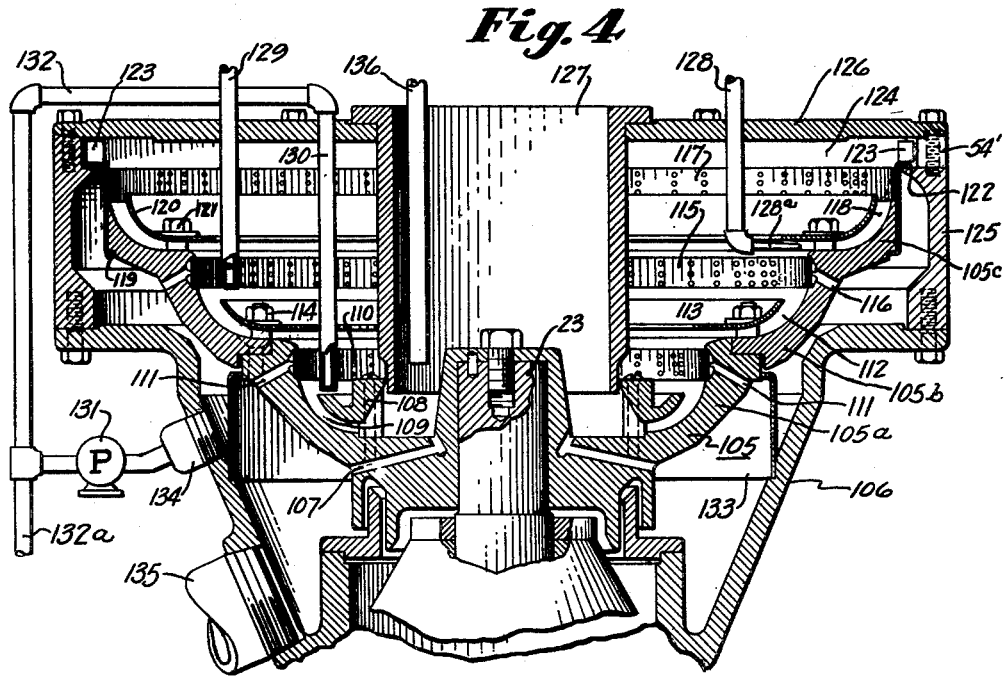
Fig. 4
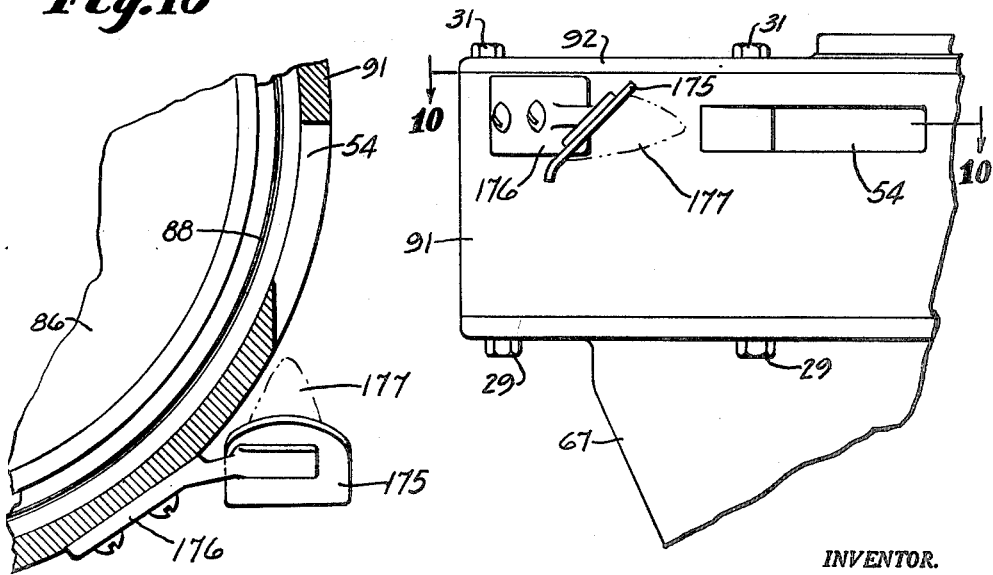
Fig. 10
Fig. 11
INVENTOR.
LAURENCE P. SHARPLES
BY
Howson & Howson
ATTORNEYS

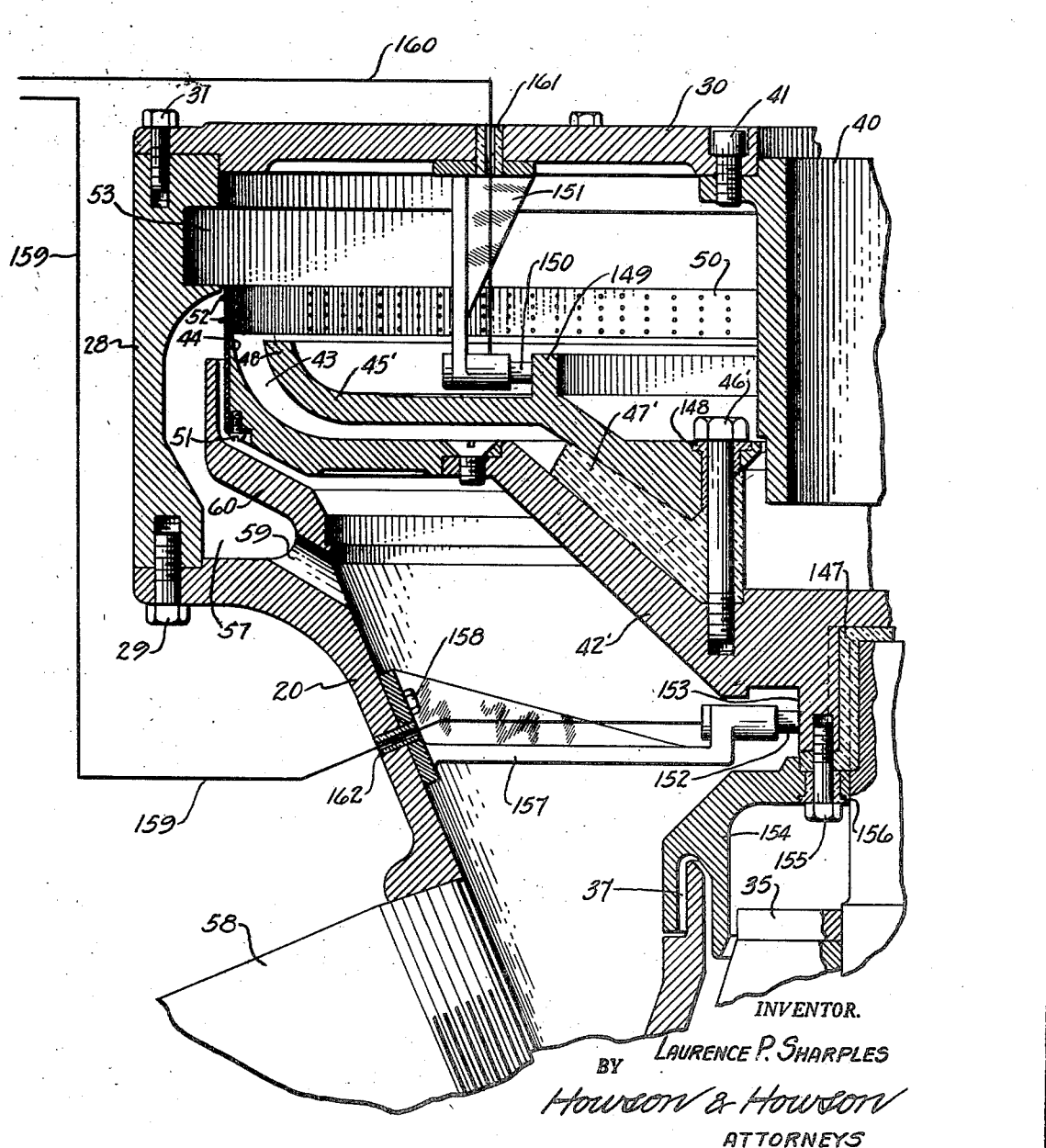

Sept. 7, 1954  L. P. SHARPLES  2,688,405
CENTRIFUGE CONSTRUCTION FOR SEPARATING SOLIDS FROM LIQUIDS
Filed Aug. 9, 1948  7 Sheets-Sheet 6

INVENTOR.
LAURENCE P. SHARPLES
BY
Howson & Howson
ATTORNEYS

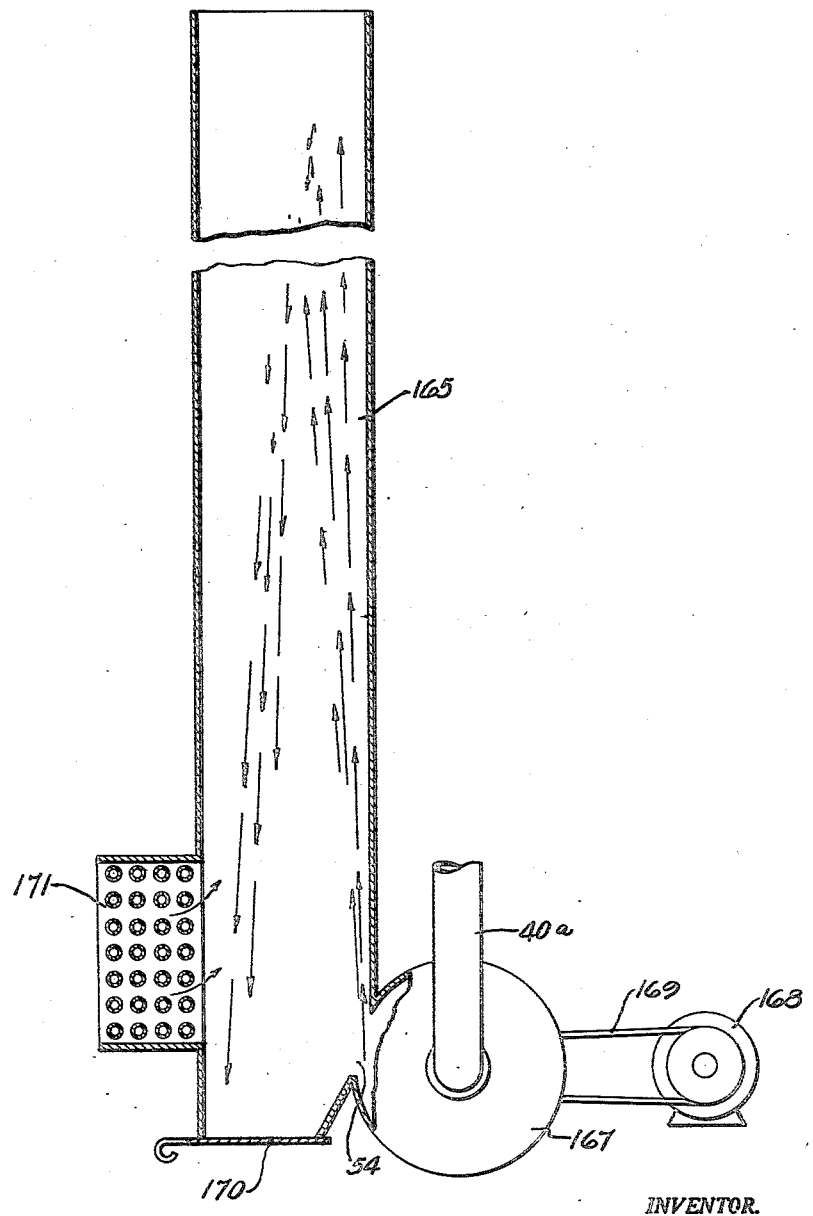

Patented Sept. 7, 1954

2,688,405

UNITED STATES PATENT OFFICE 2,688,405

CENTRIFUGE CONSTRUCTION FOR SEPARATING SOLIDS FROM LIQUIDS

Laurence P. Sharples, Haverford, Pa., assignor to The Sharples Corporation, a corporation of Delaware Application August 9, 1948, Serial No. 43,173

12 Claims. (Cl. 210—67)

1

This invention relates to the separation of solids from liquids by the application of centrifugal force. It includes processes and apparatus for removing liquid from solids centrifugally with separate discharge of the liquid and solids. It is especially adapted to the continuous separation of liquid from solids and continuous discharge of the dried solids from the apparatus.

Two general methods of centrifugally separating solids from liquids have been utilized heretofore. One is the batch-type whizzer involving hand labor for loading and unloading. The other is the continuous type centrifugal with complicated unloading scraper driven at a differential speed which among other disadvantages limits the speed at which the centrifugal can be run.

Careful study of the principles of centrifugal separation has revealed that departures from previously adopted conceptions of those skilled in this art must be made in order to accomplish the desired results.

Through a combination of unusual features, each of which contributes to the desired end result of economical separation of solids from liquids, the present invention provides processes and apparatus for centrifugally separating solids which may be employed advantageously on a great many mixtures and particularly when crystals are to be separated from a mother liquor. Among other things, the processes and apparatus of the present invention provide means for centrifugally separating solids from liquid satisfactorily and discharging these solids from the machine under centrifugal force without assistance from externally actuated mechanical parts.

In the practice of the invention, particularly in discharging solids from the machine, use is made of the forces which normally act on a mixture of solids and liquid in a centrifugal rotor.

A primary object of the invention therefore, is to provide a multi-stage centrifuge or centrifugal apparatus in which the various stages are located at varying radial distances from the axis of the centrifuge rotor and also at varying axial positions with respect thereto.

A further object of the invention is to provide suitable nozzles for introducing fluid to the interior of the centrifuge at various strategic locations whereby a wide variety of desirable results may be obtained in accordance with the material being separated and the fluid injected through the nozzles.

A further object of the invention is to provide a rotor construction for centrifuges having extremely long-wearing properties both with respect to the finish on the rotor and the manner

2 in which liquid is passed through the rotor. This rotor construction also greatly minimizes clogging.

A further object is to provide suitable material handling devices adapted to utilize the kinetic energy imparted to the material as it is ejected from the centrifuge.

A further object is to provide specialized types of local heating at various points in the process. The heating devices include a high frequency dielectric heater as well as steam and other fluid means.

A further object is to provide suitable apparatus for recycling effluent between stages of a single centrifuge rotor.

A further object is to provide an improved shape for the pressure leg in the rotor.

A still further object is to provide a centrifuge rotor and housing construction which is readily adaptable to being interchangeably mounted on a standard centrifuge frame.

A still further object is to provide methods and processes for treating various materials in a centrifugal machine.

Further objects will be apparent from the specification and drawings in which:

Fig. 4 is a section through the rotor and upper housing of a three-stage centrifuge which also includes other features of the invention;

Fig. 5 is an enlarged sectional detail of the rotor and upper housing of a centrifuge showing an electrical heating means for the material being separated;

Fig. 7 is a schematic representation partly sectioned, of a centrifugal separator and dryer, utilizing the structure of Fig. 6;

Fig. 10 is a plan partly sectioned, of the structure of Fig. 11;

Fig. 11 is an enlarged detail of the upper housing and port of a centrifuge showing a deflector plate attached thereto.

The invention comprises essentially the provision of an improved rotor for centrifuges, together with improved screen structures for such a machine, adapted to be utilized on any stage of a plurality of stages, or with a single-stage machine.

A further feature of the invention relates to the application of heat at suitable points in the centrifuge so that a continuous operation may be maintained. Heat in the form of steam, hot air, or hot water may be applied externally of the rotor, internally of the rotor, or may be added to the slurry at a point immediately preceding the contact of the slurry and the rotor. The invention also includes means for electrically heating the slurry as it passes radially across the rotor base and also includes recycling of the effluent in the multi-stage centrifuge. Improved means for handling and drying solid material to which a substantial kinetic energy has been imparted by the rotor of the machine, are likewise provided.

Figure 1:
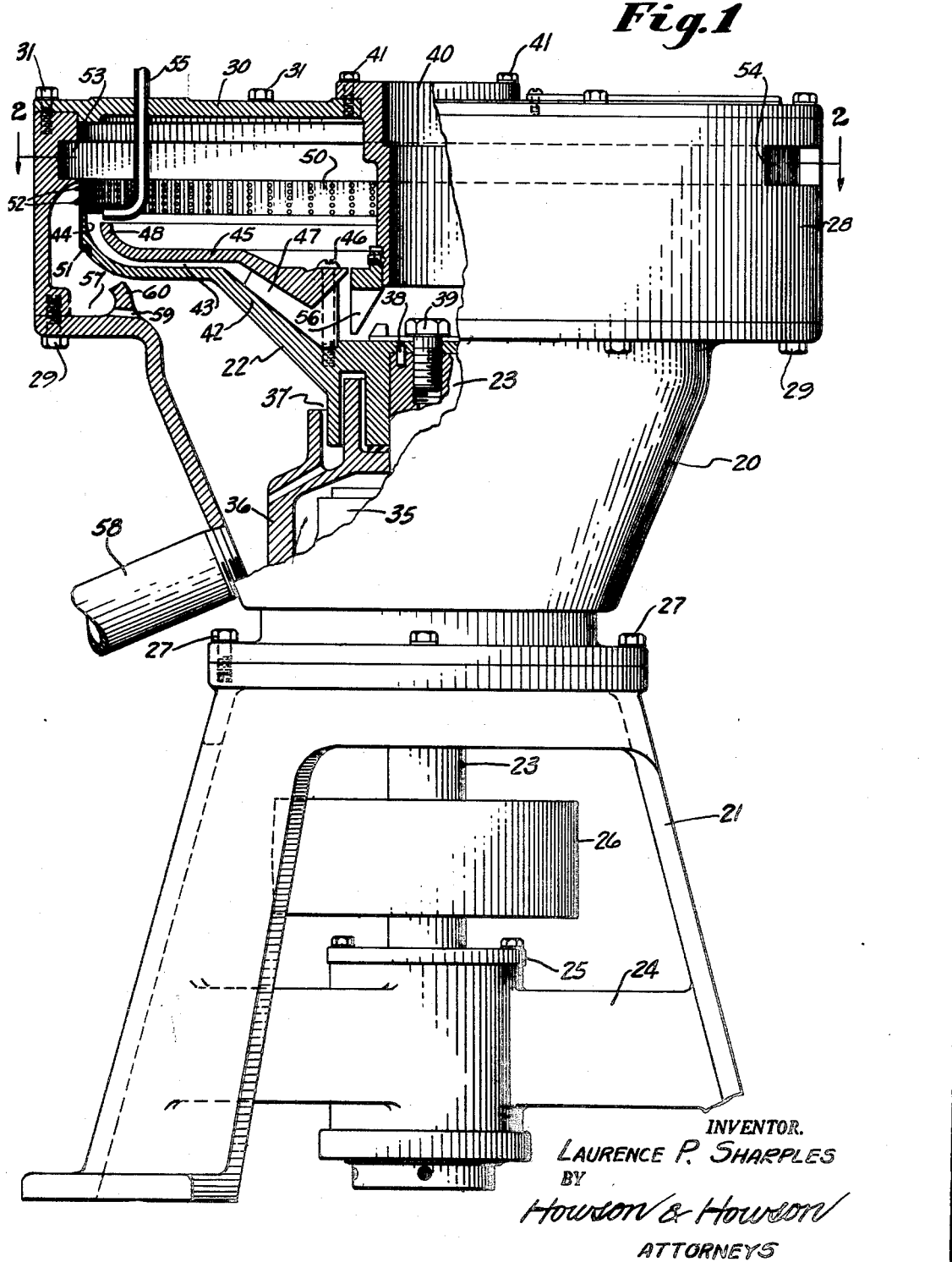
Fig. 1 is a side elevation, partly sectioned along the line 1—1 of Fig. 2, showing a single-stage centrifuge.

Referring now to Fig. 1, a centrifuge having an upper housing 20 mounted on a frame 21 comprises, in the form shown, a single-stage rotor 22 adapted to rotate at high speed within housing 20 on a vertically disposed shaft 23. Frame 21 has three brackets 24 which centrally support a journal box 25 adapted to carry both radial and thrust loads for the rotor 22 and shaft 23. A pulley 26 is carried by shaft 23 and adapted to be driven by an electric motor or other suitable means (not shown). Upper housing 20 is bolted to frame 21 by bolts 27, 27 and is of inverted frusto-conical shape. An annular sleeve 28 is bolted to the top of housing 20 by bolts 29, and a suitable lid 30 is bolted to the top of sleeve 28 at 31, 31.

The internal structure of the centrifuge of Fig. 1 consists of an upper bearing 35 for shaft 23 and an annular baffle 36 surrounding bearing 35 and having a labyrinth engagement with the bottom edge of rotor 22 as shown generally at 37. The rotor is rigidly mounted and retained on shaft 23 by means of key 38 and cap screw 39. A feed tube 40 in axial alignment with shaft 23 is mounted on lid 30 by cap screws 41 and depends from the lid to a point near the base of rotor 22.

A rotor constructed as shown in Fig. 1 is known in the art as a single-stage rotor and has a conical or upwardly flared portion 42 extending radially from the axis of the rotor. At the upper extremity of leg 42 the rotor bowl is flattened horizontally to provide a pressure leg 43 which terminates in an upwardly facing wall arcuately blending with the horizontal portion of the bowl.

Figure 2:
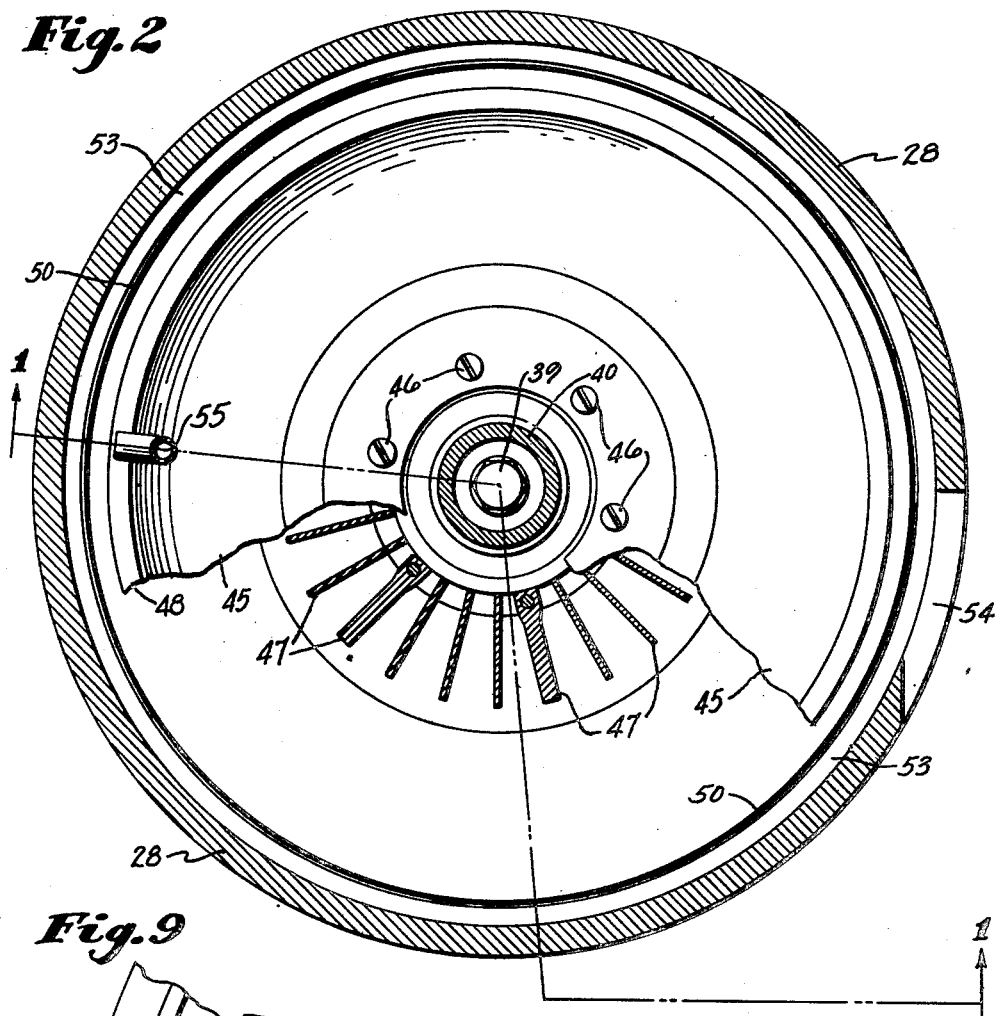
Fig. 2 is a sectional plan view, partly broken away, as seen at 2—2 of Fig. 1.

In the centrifuge art, the term "pressure leg" denotes a generally horizontal aperture extending radially between an upper and lower portion of the bowl. In the structure of Fig. 1, the top of pressure leg 43 is formed by an annular disc or cake retainer 45 rigidly mounted inside the bowl 22 by screws 46. Spacing between the disc 45 and the inside of bowl 22 is achieved by means of radially extending webs 47 shown clearly in Fig. 2. The bottom face of retainer 45 is somewhat similar to the upper face of the opposite portion of bowl 22 but it will be observed that the pressure leg is tapered radially outward and upward, as shown clearly in the drawings. The spacing between the horizontal or flat portion of the bowl and the pressure leg is considerably less than the spacing nearer the axis of the rotor, whereas the spacing between the arcuate or curved portions of the leg gradually increases to a maximum distance at the periphery 48 of the retainer. By spacing the arcuate portion of the retainer a greater distance from the rotor than the radial portion of the retainer is spaced from said rotor, the tendency for the material to clog in the zone between arcuate portions of the retainer and rotor is substantially eliminated. Furthermore, by this construction bouncing particles of the material are retained in the bowl and more efficient centrifuging is effected.

A perforated screen 50 is mounted on the extreme periphery of the rotor by means of screws 51 and may be provided with supporting rings 52, 52 to retain the radial shape of the screen. The inner periphery of sleeve 28 has an annular trough 53, the bottom edge of which is in alignment with the top edge of screen 50 so that material passing across the screen will be received in trough 53. A tangential port or exit 54 for the trough permits the relatively dry material to be expelled from the centrifuge.

A jet 55 is supported by lid 30 and depends downwardly into the rotor 22. The lower portion of jet 55 is curved so that fluid expelled from the jet will be directed onto the inner periphery of screen 50 at a point where the junction of the screen and periphery 44 of the rotor occurs. The function of jet 55 will be described more fully hereinafter.

As is well known in the centrifuge art, the slurry or material to be separated is fed into the centrifuge through the bore of feed tube 40 so that it is deposited near the center of the rotor 22. Since the bowl is rotating at high speed about its axis, the slurry is immediately thrown toward the periphery of the rotor due to centrifugal force.

Webs 56 which depend radially from tube 40, serve to subdivide the slurry or mixture and feed it into the interstices between webs 47. It is desirable to increase the centrifugal force acting on the mixture by bringing the mixture up to the speed of rotor 22 as promptly as possible. This result is facilitated by the webs 47 which impart the initial rotary action to the mixture and serve to minimize slippage between the mixture and the rotor surfaces. As increments of the slurry are added, similar increments of the cake pass upwardly between the pressure leg periphery 48 and periphery 44 of the rotor. From thence, the slurry passes axially across screen 50 so that liquid is enabled to pass through the perforations in the screen and the relatively dry solid is deposited in trough 53 with sufficient kinetic energy to impel it tangentially out of port 54. The liquid which has been centrifugally removed from the slurry through screen 50 is thrown into annular chamber 57, whence it runs into the drain 58 after having passed through ports 59 in baffle 60.

The important features illustrated in Fig. 1 reside in the provision of the rinse pipe 55 and the gradually tapering contour of the pressure leg between periphery 44 of the rotor and periphery 48 of the annular leg. Rinse fluid such as water, may be introduced at the exact point of maximum desirability through conduit 55 and it will be noted that the opening of the conduit is substantially below the outer edge of screen 50 so that solids moving onto the screen from the pressure leg may be additionally rinsed as desired.

Figure 3:
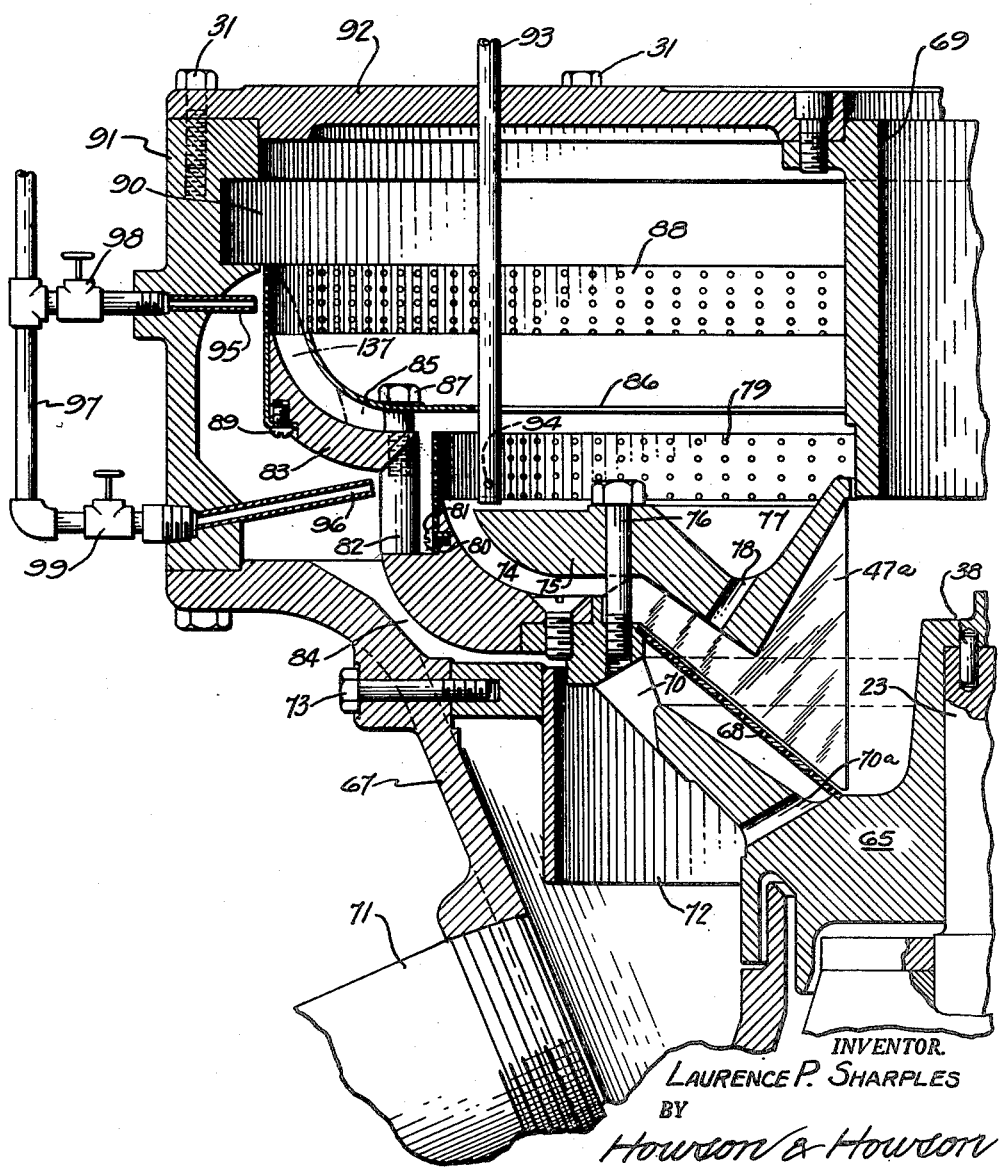
Fig. 3 is an enlarged sectional detail showing a two-stage centrifuge which incorporates features of the invention.

Fig. 3 illustrates a two-stage centrifuge assembly optionally mounted on shaft 23 in the same manner as rotor 22 of Fig. 1. Housing 67 is also adapted to be mounted on frame 20 in the same way so that the installation of a two-stage rotor requires only the substitution of housing 67 and its associated structure for housing 20. Rotor 65 has a conical screen 68 which directly receives the slurry or mixture fed through conduit 69 so that a large proportion of the liquid may be separated at a relatively low rotational velocity. Liquid passing through screen 68 flows through ports 70, 70a in the rotor and thence is discharged through the pipe 71 in housing 67. An annular baffle 72 mounted rigidly within housing 67 by means of cap screws 73, serves to direct the liquid into pipe 71. Material passing over screen 68 will form a cake in the pressure leg 74 between the first cake retainer 75 and rotor 65. The retainer 75 is functionally similar to retainer 45 of the single-stage centrifuge and is mounted on rotor 65 by means of cap screws 76. However, retainer 75 has an upwardly facing annular trough 77 which communicates with the main centrifuge passage by means of ports 78, 78.

The first stage screen 79 is secured to an annular recessed face 80 of the rotor by means of screws 81. Liquid passing through screen 79 will be discharged into housing 67 between vertical webs 82 which support the second stage 83 of the rotor. Any liquid passing through the webs will find its way to port 71 by means of clearance 84 between the housing 67 and the rotor 65. The second-stage pressure leg 85 is formed between a relatively thin, circular, downwardly convex cake retainer 86 mounted in spaced relation on the second rotor stage 83 by means of screws 87. It will again be noted that the contour of the pressure legs or space between the retainers and the face of the rotor of each stage gradually tapers upwardly and outwardly to provide greater clearance at the upper terminus than at the lower entrance.

The second-stage screen 88 is secured to second rotor stage 83 by means of screws 89, and terminates in horizontal alignment with an annular trough 90 in the upper housing 91. As in the case of Fig. 1, a lid 92 supports a conduit 93 which depends from the lid and has a tangentially facing port 94 near the bottom of the conduit. The conduit 93 is adapted to direct fluid in a tangential direction forward with respect to the rotation of the bowl at the base of the first-stage screen 79. This minimizes the tendency of the rinse liquid to bounce off of the fast traveling cake.

A nozzle 95 is radially mounted in housing 67 to direct a heating fluid against the outer periphery of second-stage screen 88. Similarly, a second nozzle 96 is likewise mounted in upper housing 91 and is adapted to direct a suitable heating fluid against the outer periphery of first-stage screen 79 between webs 82. Nozzles 95 and 96 are suitably connected to a source (not shown) of heating fluid such as steam, by means of pipe 97 and valves 98, 99.

Fig. 4 illustrates a three-stage centrifuge rotor which may likewise be mounted on the same frame that is utilized for the single and double stage machines. Rotor 105 is mounted in a housing 106 in substantially the same manner as rotors 22 and 67.

The base of rotor 105 is provided with relatively small radially extending passages 107, in order to drain the bowl when it is stationary. The first stage in rotor 105 is formed by a cake retainer 108 and the first step 105a in the rotor. The passage between the cake retainer and the first step provides the first pressure leg 109. The first stage screen 110 is mounted vertically at the upper terminus of step 105a and communicates with radially extending passages 111, 111. Material passing over screen 110 finds its way into the second stage pressure leg 112 which is in both axial and radial displacement with respect to the first stage step 105a. Cake retainer 113 is similarly secured in spaced relation to the second stage step 105b by means of studs and posts 114. The second stage screen 115 is secured in the rotor at the upper arcuate terminus of second stage step 105b and the rotor is likewise provided with a plurality of radial passages 116 for outlet of liquor which passes through the screen 115. The third stage screen 117 extends above the upper terminus of the third stage step 105c which forms the bottom of pressure leg 118. Screen 117 is secured to step 105c by screws 119. A similar cake retainer 120 for the third stage, is attached to step 105c by means of screws 121. The upper edge of screen 117 is provided with an annular lip 122 on which are mounted two plows or vanes 123 which rotate in the annular trough 124 in upper housing 125. A lid 126 encloses the rotor and is positioned on upper housing 125 similarly to the lids in Figs. 1 and 2. A feed conduit 127 is secured to the lid and is in axial alignment with the center of rotor 105. Lid 126 carries a plurality of conduits 128 and 129 for a purpose to be described more fully hereinafter. A recycling conduit 130 is connected to a pump 131 by means of conduit 132 whereby effluent from the second and third stages may be reintroduced to the first stage of the rotor through conduit 130. An annular wall or skirt 133 is positioned in housing 106 at a point just below the intake 134 for pump 131 so that effluent passing through screens 115 and 117 will be trapped by wall 133. Whenever it is desired to eliminate the recycling process, the effluent may be discharged through conduit 132a which may, if desired, connect with main pipe 135.

Conduit 128 has a horizontally extending portion 128a directed radially at the beginning of the third-stage pressure leg, whereas conduit 129 has a plurality of orifices at its lower end which are substantially opposite the second stage screen 115. It will be understood however, that the positioning of the various conduits within the housing can be altered or modified depending upon the process and material being centrifuged at any given time. For example, conduit 129 is intended to be illustrative of a rinse inlet. Obviously, the rinse inlet may be located if desired, at any given stage in the machine. Furthermore, fluids other than rinse may be introduced through the same conduits if desired. Specific examples of the beneficial results that can be obtained by means of the various conduits, will be described in greater detail hereinafter. Conduit 136 extends into the feed passage 127 and permits the addition of heat to the slurry for a purpose to be described more fully in connection with Fig. 11.

Referring now to Fig. 1, conduit 55 is provided with a nozzle radially pointed towards the screen 50. Such a conduit can be used for a rinsing liquid, preferably water, or a fluid such as air or steam may be injected through the conduit to inhibit clogging of the screen if there be a tendency for the solid particles to do so.

The centrifuge of Fig. 3 incorporates several features desirable in the processing of specific materials and the operation of this two-stage machine will be described in detail. While the centrifuge of Fig. 3 actually has three screens, this construction is referred to as a two-stage machine because there are only two pressure leg stages. However, it will be understood that the cone screen 68 may be used in conjunction with a single, double or triple-stage rotor but the results derived from the use of a sloping or conical screen are somewhat of a different nature than the results achieved by means of the vertical screens 79 and 88.

The thickened slurry is fed into the centrifuge by means of conduit 69 (Fig. 3) and passes by gravity onto the rotating bowl or rotor 65. By thickened slurry is meant a slurry that is first gravity drained, as by running it over a commercial vibrating screen. I have found that gravity draining followed by centrifugal draining has great advantage in that the majority of the mother liquor flows off in gravity draining with little tendency to carry fine crystals with it, and the majority of the fine crystals, all of which are smaller than the perforations in the vibrating screen, remain trapped amongst the larger crystals. The subsequent centrifugal draining, several hundred times more rigorous in action than the above gravity draining, loses some of these fines as they are washed through the centrifuge screen with the effluent, but the percentage of effluent drained off in the centrifuge is comparatively small and the percentage of fines lost is outstandingly less than if an undrained slurry containing a large percentage of mother liquor were fed directly to the centrifuge.

Wings or webs 47a bring the slurry up to the speed of the rotor quickly; thereupon the slurry is thrown against screen 68 by centrifugal force and most of the mother liquor passes through this screen and directly out of the centrifuge through port 71. The partly dried crystals then pass by centrifugal force into the passage 74 and onto screen 79, at which point additional drying of the crystals takes place. Rinse liquid may be fed if desired, through conduit 93 so that it will be directed against crystals at this point through orifices 94. Alternatively, steam may be fed through conduit 93 in order to heat the crystals that are on screen 79, as well as in order to heat these crystals as they pass over screen 79 into passage 85. A typical cake formation is shown in broken lines at 137 and it will be observed that part of the cake 137 overlies screen 88 and is further dried at this point. As additional material is fed into the centrifuge through feed passage 69, the cake is gradually pushed upwardly so that the upper edge or layers of the cake are thrown tangentially into annular receiving trough 90 in which the particles move due to their high velocity of discharge from the rotor until being discharged through a suitable port such as 54 in Fig. 1.

The primary purpose of steam nozzles 95 and 96 is to direct a small jet of steam exteriorly of screens 79 and 88 to heat these screens and thus prevent them from becoming clogged. The addition of heat to the screens by any convenient means serves a very important function in preventing clogging. Steam injected at this point will heat the screen and prevent or reduce deposition of solids which otherwise might occur. If no steam or other heated fluid is used at this point, the high velocity contact of the screen versus the surrounding air may cool the concentrated mother liquor discharging through the perforations to such an extent that the liquor becomes super-saturated, and stalactites extending radially outward from each perforation in the screen may thus be formed, tending to blind these perforations. The desirable effective or exposed height of the screen ranges from ½" to 1" and preferably ⅝" to ⅞". The use of a relatively narrow screen obviates the necessity for any exterior supporting structure which would otherwise interfere with the impinging of the steam jet directly on the exterior of the screen.

Furthermore, if crystals become jammed in the perforations, the additional heat melts these crystals and permits the screen to become unplugged. I have found that the application of heat to one or more of the screens is especially beneficial in the centrifuging of sugar in a continuous machine. In a periodic or batch-type machine, it is possible to rinse the screen after the cake has been removed, in order to maintain the screens in an unclogged condition. However, such an opportunity is not present in a continuous machine and therefore the heated screen is especially advantageous in this process.

Another important feature of my invention is illustrated in both Figs. 3 and 4 and has to do with the multi-stage rotor. The drying effect of a single-stage centrifuge may be nearly doubled by adding a second stage. Additional stages are also especially important in large diameter centrifuges. For instance, if a single-stage machine 18" in diameter is compared with a single-stage machine 36" in diameter, the screen area of the latter is only double that of the former, whereas the weight and cost of the latter may well be four to eight times that of the former. Furthermore, the centrifugal force on the screen of the 36" machine will be about one-half that of the 18" machine, assuming that the peripheral speed is held the same for purposes of strength. Hence, unless additional stages are used, increasing the diameter of the machine gives little if any increase in capacity, but it does greatly increase the cost and lessens the centrifugal force. Thus, a larger diameter machine may fail to dry some products sufficiently. On the other hand, where multi-stage machines are used, two stages can be readily provided in an 18" diameter machine and six stages are entirely possible in a 36" diameter machine. Thus, the latter may have four to five times the capacity of a single-stage machine of 36" diameter. The multi-stage machine has the additional advantage that at least one stage may be flooded with rinse or steam. In this way, the screens for any or all stages may be kept clear by a rinse (water or steam) from the interior; or the screens may be heated from the exterior with water or steam, as shown in Fig. 3.

A further advantage of a multi-stage machine resides in the ability to combine a pressure leg or vertical screen with a non-pressure leg or conical screen such as shown in Fig. 3. The use of these different types of screens, one following the other, has a particular advantage since a large volume of liquid in some cases must be disposed of through the first screen contacted by the mixture, in order that the subsequent or pressure leg screens may be properly effective for more intensive final drying. Therefore, a screen of large area is required initially, whereas a screen of limited area only is possible on a pressure leg stage owing to the much smaller distance that the pressure leg will radially push the cake. Screen 68 is illustrative of a large area screen adapted for initial centrifuging of the mixture, and which is able to remove a large percentage of the liquid. It will be obvious, referring to Fig. 3, that if a vertical or pressure leg type of screen were used in place of cone screen 68, the maximum vertical length of such a screen would be limited, whereas the conical type of screen 68 may be made to have any desired area so long as the centrifugal force present is sufficient to carry the solids across the screen. It will be understood that the angle of the screen should be greater than the angle of repose of the crystal mass undergoing centrifuging.

Figure 9:
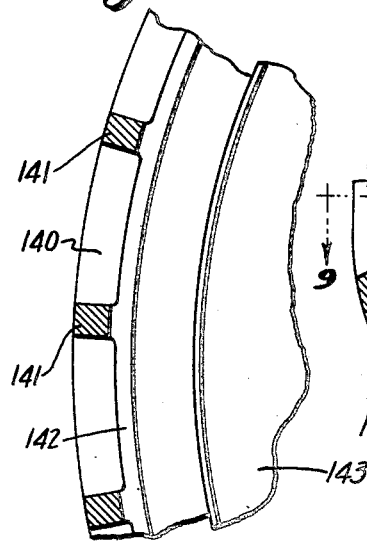
Fig. 9 is a fragmentary sectional plan as seen at 9—9 of Fig. 8.
Figure 8:
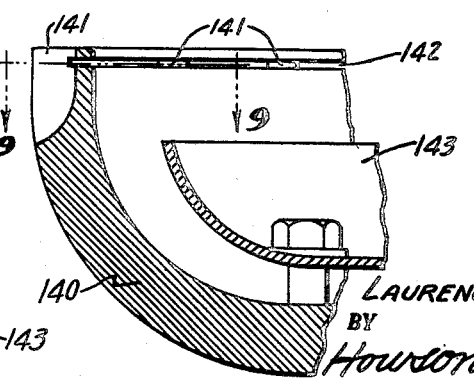
Fig. 8 is a fragmentary sectional detail of a rotor showing a modified form of rotor construction.

Referring now to Figs. 8 and 9, a modified form of rotor or bowl construction is illustrated in which the use of a separate screen is entirely eliminated. This construction is of particular advantage in drying relatively hard solids such as coal, which have an extremely abrasive effect on the screen. The bowl 140 is a unitary casting having a plurality of vertical webs 141 around the upper edge of the periphery of the bowl. A milled slot 142 around the inner periphery of the bowl serves as a convenient outlet for the liquid and communicates directly with the interstices between webs 141. In the preferred construction, it will be noted that the slot 142 is located axially above the cake retainer 143. I have found that a slot having a width ranging from .010" to .040", preferably .027", provides a desirable non-clogging result with many sizes of crystals and solids. Furthermore, the slot is near the upper rim of the rotor, at which point the cake, of wedge-shaped section, is relatively thin and hence presses lightly against the slot. The pressure due to the pressure leg is also relatively light at this edge of the cake. Thus, the tendency to grind or grate the crystals as they pass over the slot is substantially lessened as compared with passing the cake over the screen shown in Fig. 1. This construction permits an extremely hard bowl surface and also enables the interior of the bowl to be ground and polished. Customarily the screen of Fig. 1 is made of soft material so that the perforations therein may be punched. Therefore, the elimination of a relatively soft screen provides increased bowl life and reduces the cost of construction.

The diameter of the bowl above the slot can be larger, say one slot width larger than the diameter of the bowl below the slot. This will tend to eliminate particle size degradation as it will eliminate much of the grater action on particles passing across the slot. Furthermore, this permits the cake to slide more freely, thus avoiding the tendency to plug the bowl as compared with the multiple perforations across which the cake must slide in Fig. 1.

The problem of providing a long-wearing bowl surface in a centrifuge has been extremely difficult. Certain materials when fed through the centrifuge have an extremely high abrasive action on the bowl surface and it has been found that the bowls and/or screens must be replaced after a few weeks of operation in some cases. Not only is it essential to reduce abrasion on the bowl to a minimum, but the surface of the bowl should be extremely smooth to permit the particles to slide over the bowl without clogging it. Bowls made of various alloys have been tested but in each case the results obtained with certain materials were unsatisfactory. However, when these bowls were chromium plated, satisfactory results were achieved. I have found that a very satisfactory finish for the interior of a centrifuge bowl is a highly polished and unusually thick chromium plate. Naturally, when a bowl becomes abraded, the solids will refuse to slide and the machine must be stopped for suitable cleaning or replacement. Experiments to improve the sliding qualities of the bowl are well illustrated by the following test results:

For example, a 12" centrifuge bowl fabricated from 18-8 stainless steel, having a hardness of 150 Brinell, was polished to a mirror finish. When this bowl was installed in the centrifuge using a standard speed, it was found that the bowl immediately plugged when using anthracite coal, even after several attempts. The bowl was then removed and chrome plated. Although the finish on the bowl was apparently not smoother, when it was installed in the machine under the same conditions the solids did not show any tendency to clog whatsoever. The plating however, had a hardness of approximately 800 Brinell as opposed to the 150 Brinell of the plain stainless steel.

Another test was made with a specially cast bronze bowl having a surface hardness of 250 Brinell. Although the results with the bronze bowl were somewhat improved over the stainless steel bowl, it plugged after a short period of operation. When the bowl was removed from the centrifuge, the surface of the bowl clearly showed a frosted or abraded condition.

As a result of many tests, it has been found that a universally satisfactory bowl surface should have minimum limits of smoothness and hardness. I have found that the American Standards Association #16 finish—usually designated "ASA 16"—is the minimum universally satisfactory smoothness for the interior surface of the bowl.

The hardness of the bowl as determined likewise from many tests should be at least 300 Brinell for universal use and preferably 500 Brinell or higher—for example, between 600-800 Brinell. Naturally, it will be understood that the absolute minimum hardness may be dependent upon the size and speed of the centrifuge as well as the material being processed. As noted above, properly plated chromium surfaces are on the order of 800 Brinell or higher.

Customarily, the mixture of crystals and mother liquor that is fed to a continuous centrifuge, is both warm and saturated or supersaturated. As the mixture enters the centrifuge, and perhaps before it enters, it is somewhat cooled. Furthermore, the heavy draft of air induced into the centrifuge accentuates this cooling. Therefore, there is a strong tendency for the cooled mother liquor to crystallize further, thereby coating the feed wings and webs 47, 47a so that the space between the webs gradually becomes closed. I have found that the addition of water or steam to the slurry as it is fed through the feed conduit completely eliminates this undesirable deposition of crystals on the feed wings. This result is achieved by diluting the mother liquor and by warming it. This introduction of the steam or water, or both, is by means of conduit 136 in Figs. 4 and 12.

Figure 12:
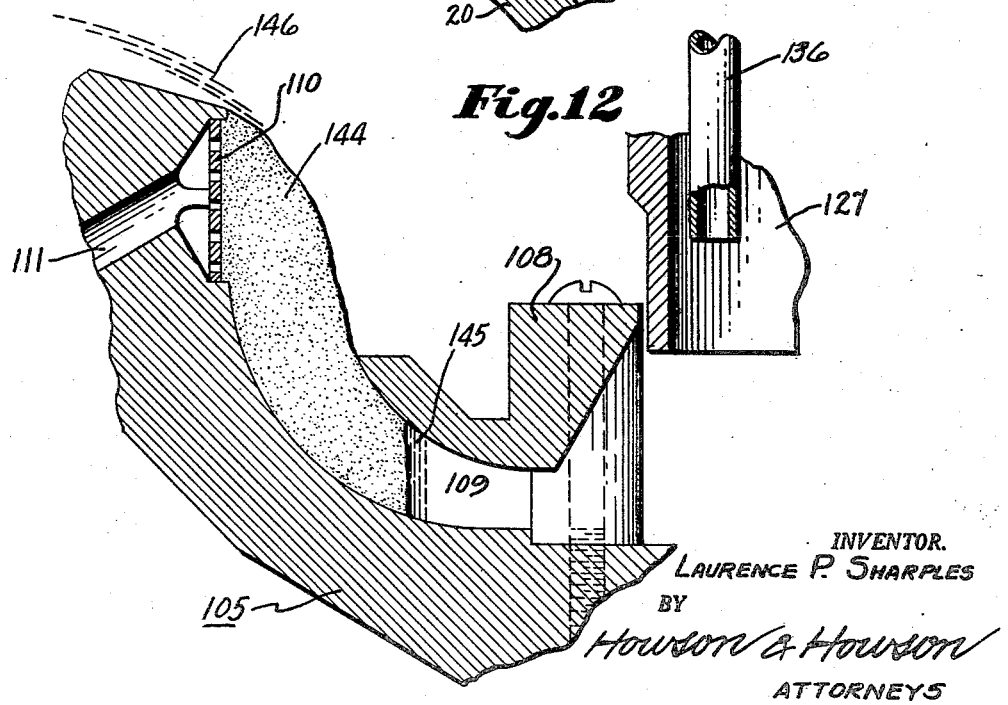
Fig. 12 is an enlarged sectional detail illustrating an improved centrifuge construction and method of operation.

An additional desirable result of feeding slight amounts of steam through conduit 136 is illustrated in Fig. 12 which shows diagrammatically the action of the cake 144 in the pressure leg of a centrifuge bowl such as bowl 105 of Fig. 4. The broken lines at 145 indicate layers of crystals that will be deposited on the cake 144 during extremely brief periods of time while the slurry is being fed continuously to the centrifuge. Lines 146 represent crystals that are continuously being pushed from the opposite end of cake 144 as increments or layers of crystals are being added at 145. During a very brief interval of time, the thickness of the newly deposited cake at 145 will be approximately the diameter of one crystal. Thus, steam fed through conduit 136 will reach and condense upon every crystal that passes through the bowl 105. I have found that the introduction of steam at the inner edge of cake 144 provides an especially desirable result since the entire mass of crystals has by increments been subjected to the beneficial heating of the steam. In conventional centrifuges only the exposed inner surface of an already formed cake is customarily steam treated, with the result that the crystals in the body of the cake do not come in contact with the steam as the steam will not pass through the cake, but will condense on the surface. The advantages of having steam contact and condense upon each and every crystal as it falls upon the cake from the continuous feed are:

1. Heat lowers the viscosity of the mother liquor which coats each crystal;
2. Water of condensation further reduces the viscosity of that mother liquor by diluting it;
3. The condensate acts as a perfectly dispersed rinse; and
4. The crystals themselves are heated and therefore air dry more readily immediately after leaving the rotor.

A further advantage of heating certain crystals while in the pressure leg or legs, resides in the fact that such additional heating assists in the final drying of the crystals after discharge from the centrifuge. The details of the invention relating to the final drying will be described more fully in connection with Fig. 7.

In the heating of certain crystals and particularly sugar, it is especially desirable that the crystals or mother liquor be heated in a very short space of time before there is an opportunity for the crystals to become dissolved further in the mother liquor. Therefore, I have devised an electrical heating device intended to provide quick heating homogeneously throughout the cake without any localized hot spots and, furthermore, without any formation of condensate.

Referring now to Fig. 5, which illustrates an enlarged sectional detail of a single-stage centrifuge, I have insulated rotor 42' by means of a non-conductive material 147 placed between the shaft 23 and the bowl. The cake retainer 45' is likewise modified by the provision of non-conductive webs 47'. Cap screws 46' likewise are insulated from the cake retainer 45' by means of a non-conductive bushing 148 so that the cake retainer 45' and the bowl or rotor 42' are not only electrically insulated from each other but from the rest of the machine. The cake retainer 45' is provided with an annular contact ring 149 against which an electrical brush 150 is positioned by means of bracket 151 mounted on lid 30. A similar brush 152 is adapted to wipe against annular contact hub 153 on bowl or rotor 42'. Bowl 42' is connected to the labyrinth seal 37 through a lower ring member 154 secured by cap screws 155 mounted in insulating bushing 156. Bracket 157 positions brush 152 and is retained on the wall of housing 20 by means of cap screw 158. Suitable electrical leads 159 and 160 are connected to a source of electrical current through insulating bushings 161 and 162. As the mother liquor and crystals pass through the pressure leg 43, they become quickly heated by serving as the electrical conductor between cake retainer 45' and the bowl 42'. When it is appreciated that the entire length of time that a single crystal remains in the centrifuge is of the order of one to two seconds, it will be understood that the heating applied to the crystals will not be of sufficient duration to permit excessive dissolving of the crystals to take place.

Not only does the quick heating of the crystals in the centrifuge assist in the final drying of the crystals, but I have in addition provided means which cooperate with the entire separating and drying process for obtaining completely dried material.

Figure 6:
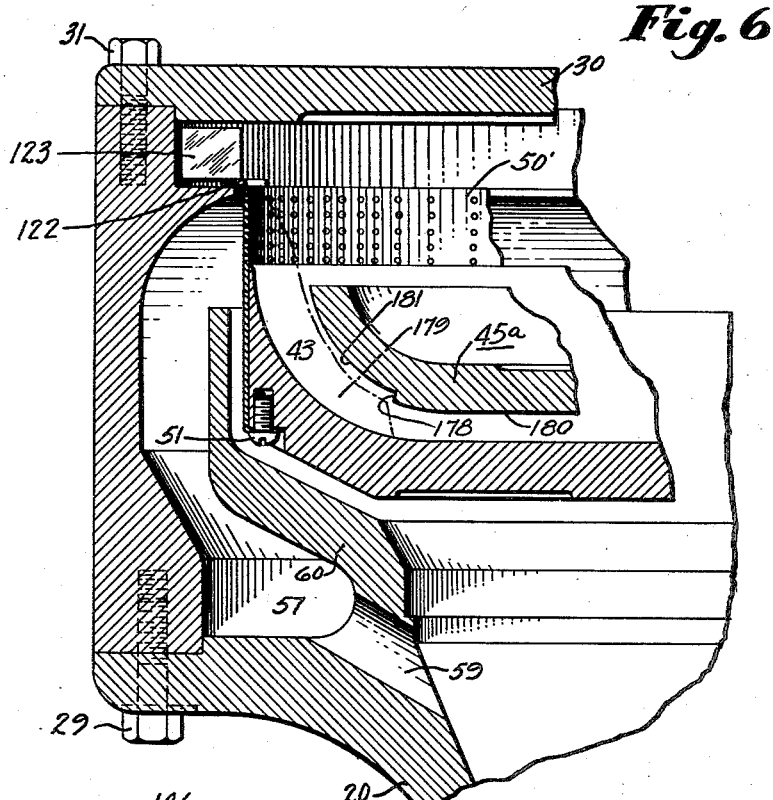
Fig. 6 is an enlarged sectional detail of the rotor and upper housing, showing the use of a plow on the rotor for removing solids from the housing.

Referring now to Figs. 4, 6 and 7, the screen 50' in Fig. 6 is provided with a pair of plows or vanes 123 which may be mounted at the extreme periphery of the screen by means of an annular flare 122. Fig. 6 illustrates the installation of blades or plows 123 on a single-stage machine such as that of Fig. 1, whereas Fig. 4 shows the same modification on the three-stage machine. It will be understood that this construction may be employed with any number of stages. When additional drying of the solids is desirable after the solids have been discharged from the centrifuge proper, it is of course extremely advantageous that all the solids be discharged from one port 54 of the centrifuge casing in order that multiple streams of discharging crystals do not have to be collected for their further handling. Certain materials have a tendency to cling to the annular troughs 53, 90 and 124, thus hindering the proper discharge of the solids from only one port. In order to insure that all the solids will be discharged from a single port without clogging the casing and with a suitable velocity for further drying, the blades attached to the top of the screen serve to eject the material, even though it may be somewhat damp, from port 54.

Subsequent drying of the material where desirable, can be readily achieved by means of a drying tower 165 (Fig. 7) having an opening in registry with the port 54 of the centrifuge. In the showing of Fig. 7, the centrifuge is desirably positioned so that its shaft is horizontal rather than vertical. In this event, the feed tube 40a may be extended vertically in any manner convenient for the proper supply of slurry to the centrifuge. The supplying means may include a vibrating screen or stationary screens combined with hoppers, depending upon the nature of the material being fed.

The centrifuge 167 is driven by motor 168 and belt 169 in the conventional manner. Material discharged from port 54 is projected vertically upward in tower 165 and is permitted to fall into a removable base or hopper 170 for the tower. Additional drying air is fed into the tower over heating coils 171 so that the solids are subjected to drying air, both during rising and falling in the tower. Tower 165 is open at the top and I have found that the natural draft in the tower is sufficient to supply ample hot air for the final drying stage.

Particular advantage is derived from the use of the blades 123 on the rotor together with the vertical drying tower 165 because of the fact that the particles when discharged from port 54 do not impinge upon any object until they are thoroughly dried. The position of the port 54 with respect to the tower is such that the particles will be discharged in a substantially vertical direction for 20 to 50 feet, depending upon the nature of the material and the speed of the centrifuge. I have found that crystals having 1.5% moisture as they are discharged from the centrifuge will contain not more than 0.25% by the time the particles fall to the bottom of the tower. The benefits of the drying tower and blades are especially noteworthy in connection with salt, which has a tendency to clot on any surface against which the damp salt discharging from the centrifuge impinges. The construction of Fig. 7 enables salt to be further heat dried until it is free running without any undesirable clogging or clotting in the drying process and without the necessity for adding any moving parts to the apparatus.

In the event that a drying tower such as described in Fig. 7 is not used, it may be desirable to provide a deflector 175 (Figs. 10 and 11) mounted on housing 91 by means of bracket 176. The deflector is in tangential alignment with port 54 as shown in Fig. 10 and is spaced over 4″ from the port. It has been found that when the discharged crystals strike the deflector 175, the very finest and dampest of the crystals tend to stick to the deflector and gradually form a conical cake 177. This cake 177 gradually increases in size and length but by spacing the deflector a sufficient distance from port 54, I have found that the cake will drop off before it has an opportunity to build up sufficiently to plug the port. When the deflector is placed too close to the port, the cake will build up and completely close the port in a short time.

Fig. 6 illustrates the provision of a step 178 in the cake retainer which cooperates with the diverging pressure leg 43 to insure proper sliding and cake formation in the bowl. The lower portion of a cake 179 is shown as having no contact with the step portion of cake retainer 45a. The initial part of the pressure leg formed by the substantially horizontal surface 180 of the cake retainer, directs the crystals onto the cake, whereas the upper recessed portion 181 serves to retain bouncing particles in the bowl. I have found that this modified construction for the cake retainer greatly facilitates centrifuging certain materials.

In the processing of raw sugar, several modifications have been found to be extremely desirable. Referring now to Fig. 4, a multi-stage machine enables recycling of effluent in the sugar refining art. As a minimum of rinse water should be used on account of later steps in the process, it is effective to re-use the rinse water counter-currently, in order that each gallon may be used to its maximum effectiveness. In this centrifuge here described, a former stage may be rinsed with the effluent from a later stage which is, in effect, counter-current rinsing. Effluent from the second and third stages is trapped by wall 133 so that it may be pumped through conduit 132 and tube 130 by means of pump 131. It will be understood that the effluent from separate stages may be recycled in the same manner instead of re-cycling the effluent from two stages, as shown in Fig. 4. It has been found that no solution of the sugar by water is necessary in order to properly wash it in a centrifuge if this saturated syrup is used instead of water as the washing medium.

Another desirable method of refining raw sugar comprises the following steps:

The usual amount of affination syrup is first added to the raw sugar and the mixture heated to about 150° C. This mixture is fed to the first-stage of a continuous multi-stage centrifuge such as shown in Fig. 4. The first stage reduces the moisture content of the sugar below 1% and the syrup film on the crystals to below 5% of the weight of the sugar present. The sugar is then flash-heated by means of steam introduced through conduit 128 and nozzle 128a as it passes to the third stage. This heating is preferably done by the condensation of steam on the surface of the crystals. About 1% by weight of steam will be sufficient to increase the temperature of the film of syrup and the crystals by about 25° F. The water of condensation will dilute this film to some extent. However, this condensate will not completely mix with the viscous film of syrup on each crystal. The heating on the other hand, will heat the film and reduce its viscosity nearly one-half and the water of condensation will make a further reduction and provide some scouring action. It is desirable that the above heating should be done quickly so that the water of condensation does not have time to dissolve its full complement of sugar.

It will be understood that the invention includes structural refinements in a centrifuge which may be utilized to the best advantage in accordance with the particular problem to be encountered. Naturally, flash-heating either with the dielectric method or by steam, as well as rinsing or recycling, may be applied at or between various stages. It is essentially the provision of a multi-stage rotor together with suitable accessories that enables a wide variety of modifications in the process to be accomplished. Illustrative examples of desirable methods for treating certain specific materials have been given. The beneficial results and improved products obtained are likewise noteworthy.

It will be understood that certain variations and modifications may be made without departing from the spirit of the invention as defined in the appended claims.

Having thus described my invention, I claim:

1. In a centrifuge, a rotor for separating solids from liquids and having a perforate member of relatively short axial dimension extending about the periphery of said rotor, said rotor having a surface portion extending radially of the rotor axis and merging outwardly in an arcuate surface portion terminating in a surface portion extending axially of the rotor, a cake retaining member mounted on said rotor, said retaining member having a surface portion extending radially of the rotor axis and merging outwardly in an arcuate surface portion terminating in a surface portion extending axially of the rotor, said surface portions of the retaining member being disposed in spaced substantially confronting relation to correspondingly named surface portions of the rotor and the spacing between the arcuate and axial surface portions of the retainer and rotor being greater than the spacing between the radial surface portions of said members.

2. A centrifuge constructed in accordance with claim 1, in which the axial rotor surface is provided with a plurality of axially extending webs on the outer periphery of the rotor, and walls on the rotor defining an annular slot in spaced relation from the edge of the rotor and having fluid connections between the inside and outside of the rotor between said webs.

3. A centrifuge as claimed in claim 1 wherein the perforate member has an axial dimension not substantially greater than one inch.

4. A centrifuge as claimed in claim 1 in which the said surfaces of the rotor member have a hardness of at least 300 Brinell and a smoothness of at least The American Standards Association #16 finish.

5. Centrifuge construction in accordance with claim 1 in which the annular space between the rotor and the retaining member diverges gradually in both the radially outward and axially extending directions.

6. A centrifuge as claimed in claim 1 wherein the spacing between the arcuate and axial surface portions of the retainer and rotor members increases gradually in the direction outwardly from the radial surface portions of said members.

7. In a centrifuge, a rotor for separating solids from liquids and having a perforate member of relatively short axial dimension extending about the periphery of said rotor, walls defining an annular passage contiguous to said perforate member to receive solid particles of material therefrom and having an outlet opening for said particles extending tangentially from said annular passage, a plurality of blades mounted on the periphery of the perforate member and positioned within said annular passage to remove solid particles therefrom and simultaneously impart substantial kinetic energy to said particles causing them to be discharged outwardly through said tangential outlet opening in the passage, and deflector means disposed in outwardly spaced relation to said tangential outlet opening from the annular passage for engagement by the solid particles discharged through said outlet opening, said spacing of the deflector means from the outlet opening causing solid material caking on the deflector to drop therefrom of its own weight before plugging said outlet opening.

8. A rotor for a centrifuge adapted to separate solids from liquids having a perforate annular surface, a cake retainer mounted on said rotor and electrically insulated therefrom, an annular electrical contact surface on said rotor, an annular electrical contact surface on said retainer, and means including electrical conductors for supplying electrical current to each of said contact surfaces.

9. Apparatus in accordance with claim 8, having a plurality of electrically non-conductive webs positioned radially between the retainer and the rotor.

10. A centrifuge adapted to separate solids from liquids having a housing, a rotor mounted in said housing, rotor driving means in the housing, electrical insulating means between the rotor and the driving means, a perforate annular surface on said rotor, an annular retainer mounted in said rotor and electrically insulated therefrom, an electrical contact adapted to wipe the rotor, a second electrical contact adapted to wipe the retainer, and means for supplying electrical current to said rotor and retainer through each of said contacts to heat material passing between the retainer and the rotor.

11. A centrifuge having a rotor, a plurality of steps on said rotor, said steps being arranged in sequential axial and radial relationship to each other, a conical screen preceding the first of said steps and extending radially from the axis of the rotor, a cake retainer forming a pressure leg in at least one of said steps and a cylindrical screen positioned between each of said steps.

12. In a centrifuge for separating solids from liquids, a rotor, a radial inner surface on said rotor, an arcuate axial surface around the inner periphery of the rotor and formed to blend with the radial surface, a radial retaining member in axial spaced relation to said surfaces, a facing lip forming the periphery of said retaining member, the space between the lip of the retaining member and the adjacent surface on the rotor being greater than the space between the radial portions of the rotor and the retaining member, a perforate annular screen secured around the edge of the rotor, the exposed height of the screen being not less than ½" and not greater than 1", means for feeding slurry to the base of said rotor, and a conduit adapted to discharge a treating fluid into the slurry in a zone adjacent the axis of the rotor.

References Cited in the file of this patent

UNITED STATES PATENTS

| Number | Name | Date |
|---|---|---|
| 952,653 | Trent | Mar. 22, 1910 |
| 1,546,871 | Thompson | July 21, 1925 |
| 1,569,778 | Murphy | Jan. 12, 1926 |
| 1,581,089 | Roberts | Apr. 13, 1926 |
| 1,608,694 | Cain | Nov. 30, 1926 |
| 1,792,082 | Fink et al. | Feb. 10, 1931 |
| 1,894,713 | Searle | Jan. 17, 1933 |
| 1,936,866 | Van Ackeren | Nov. 28, 1933 |
| 2,040,822 | Brewer | May 19, 1936 |
| 2,055,778 | Stevens | Sept. 29, 1936 |
| 2,095,206 | Sharples | Oct. 5, 1937 |
| 2,341,230 | Neuman | Feb. 8, 1944 |
| 2,368,811 | Einarsson | Feb. 6, 1945 |
| 2,409,713 | Sharples | Oct. 22, 1946 |
| 2,435,023 | Van Riel | June 27, 1948 |

FOREIGN PATENTS

| Number | Country | Date |
|---|---|---|
| 542 | Great Britain | Mar. 3, 1856 |
| 221,961 | Germany | Mar. 27, 1908 |

OTHER REFERENCES

The Electrochemical Society, Special Volume, Modern Electroplating, 1942, pages 138–142.